United States Patent [19]

Sherrod

[11] Patent Number: 4,689,846
[45] Date of Patent: Sep. 1, 1987

[54] DOCK LEVELER APPARATUS

[75] Inventor: Danny Sherrod, Joshua, Tex.
[73] Assignee: Bluff Welding Inc., Burleson, Tex.
[21] Appl. No.: 926,634
[22] Filed: Nov. 3, 1986
[51] Int. Cl.$^4$ ............................................. E01D 1/00
[52] U.S. Cl. .................................................... 14/71.3
[58] Field of Search ...................... 14/71.1, 71.3, 71.7;
193/38, 41

[56] References Cited

U.S. PATENT DOCUMENTS

| | | | |
|---|---|---|---|
| 3,460,175 | 8/1969 | Beckwith et al. | 14/71.3 |
| 3,583,014 | 6/1971 | Brown et al. | 14/71.3 |
| 3,636,578 | 1/1972 | Dieter | 14/71.3 |
| 3,685,077 | 8/1972 | Wiener et al. | 14/71.3 |
| 3,974,537 | 8/1976 | Ellis et al. | 14/71.3 |
| 4,065,824 | 1/1978 | Ellis et al. | 14/71.3 |
| 4,257,137 | 3/1981 | Hipp et al. | 14/71.3 |

Primary Examiner—Stephen J. Novosad
Assistant Examiner—John F. Letchford
Attorney, Agent, or Firm—Arthur F. Zobal

[57] ABSTRACT

The invention is incorporated in a dock leveler of the type having a base plate adapted to be attached to a side edge of a dock, a bridge plate having a first edge pivotally coupled to the upper edge of the base plate and a lip plate pivotally coupled to the other edge of the bridge plate. First and second linkages have first ends respectively pivotally coupled together. The other end of the first linkage is pivotally coupled to the under side of the bridge plate. The other end of the second linkage is pivotally coupled to the base plate for pivotal movement about a pivot axis that is fixed relative to the base plate. A catch member has a first end pivotally coupled to the under side of the lip plate and a free end adapted to hang downward therefrom. The catch member has an engaging portion adapted to releasably engage structure of the first linkage when the bridge plate is moved to its rearward position for holding the free end of the lip plate away from and forward of the bridge plate as the bridge plate is moved from its rearward position toward its forward extended position for allowing the lip plate to engage the bed of a vehicle.

7 Claims, 8 Drawing Figures

DOCK LEVELER APPARATUS

BACKGROUND OF THE INVENTION

1. Field of the Invention

The invention relates to an apparatus for extending the lip plate of a dock leveler for movement of the lip plate onto the bed of a truck or other vehicle located next to the dock.

2. Description of the Prior Art

Dock levelers generally employ a base member attached to the side of a dock, a bridge plate which is pivotally attached to the edge of the base member and a lip plate which is pivotally attached to the other edge of the bridge plate. The known manually operated dock levelers in use today place a large amount of strain on the operator when lifting the plates for proper positioning. Spring mechanisms are employeed on dock levelers to aid in lifting the plates; however, they do not provide,, the assistance needed.

U.S. Pat. Nos. 3,974,537 and 4,065,824 are directed to different types of mechanisms for assisting the operator in lifting the plates of a dock leveler for proper positioning.

SUMMARY OF THE INVENTION

It is an object of the invention to provide a simple and effective apparatus which can be retrofitted to some existing dock levelers for facilitating the operator in lifting and positioning the plates.

When installed on a dock leveler, of the type mentioned above, the apparatus comprises first and second linkage means having first ends respectively pivotally coupled together with the other end of said first linkage means being pivotally coupled the underside of the bridge plate and the other end of said second linkage means being pivotally coupled to the base member for pivotal movement about a pivot axis that is fixed relative to the base member. Catch means is provided having a first end pivotally coupled to the under side of the lip plate and a free end adapted to hang downward from the lip plate. The catch means has an engaging means adapted to releaseably engage structure of said first linkage means when the bridge plate is moved to a rearward positioning for holding the free end of the lip plate away and forward of the bridge plate as the bridge plate is moved from its rearward position toward a forward extended position for allowing the lip plate to engage the bed of a vehicle.

In a further aspect, holding means is attached to the bottom side of the bridge plate which allows the lip plate to hang downward from the bridge plate when the bridge plate is in its forward extended position and which engages and holds the free end of the lip plate away from the bridge plate as the bridge plate is moved to its rearward position to allow the catch means to swing to a position for allowing its engaging means to releaseably engage said structure of said first linkage means for holding the free end of said lip plate away from and forward of the bridge plate as the bridge plate is moved from its rearward position towards its extended forward position.

A handle is removably attachable to the bridge plate for allowing the operator to move the bridge plate rearward and then forward for proper positioning of the lip plate.

DESCRIPTION OF THE PREFERRED EMBODIMENT

Figure 1:
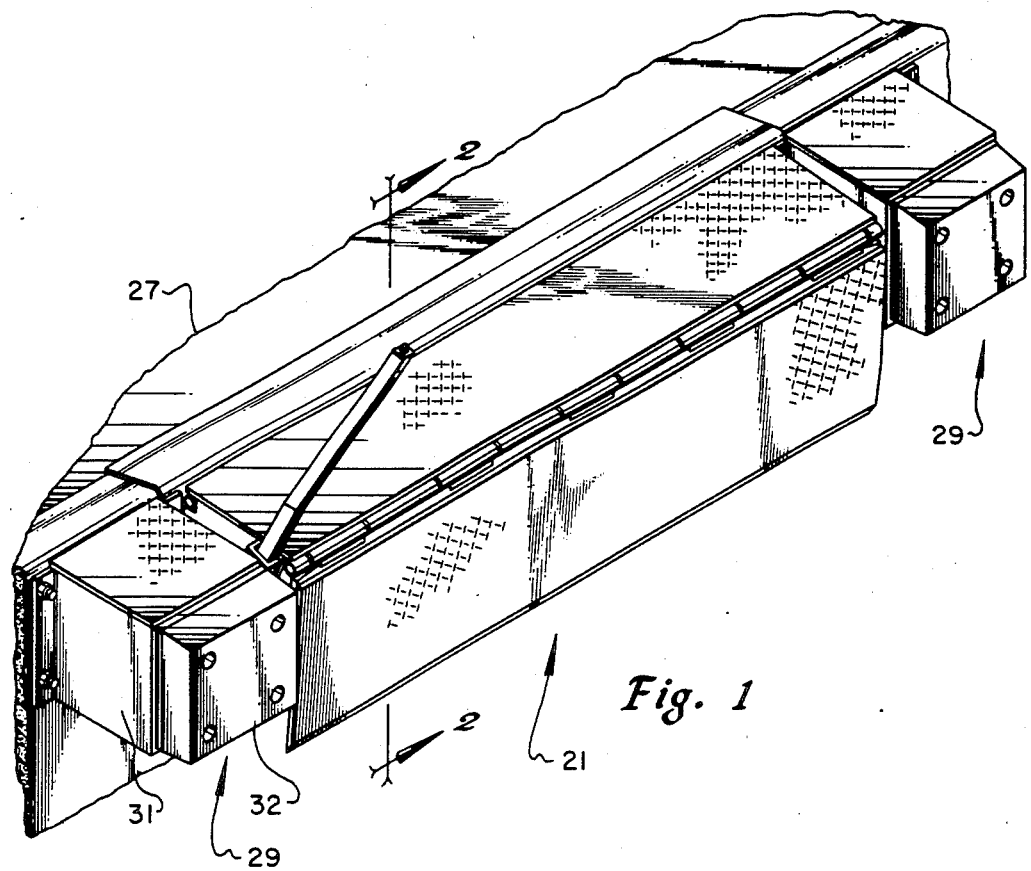
FIG. 1 is a view of the upper portion of a dock leveler in a normal position when not in use.
Figure 7:
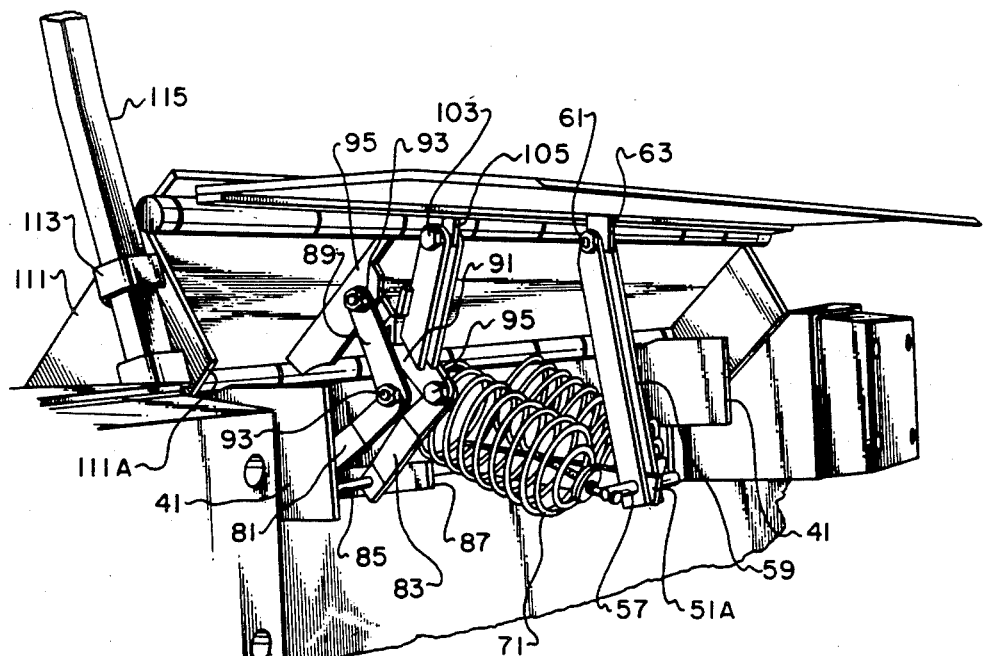
FIG. 7 is another view of the dock leveler with its bridge plate moved forward from its rearward position and with its lip plate extended outward therefrom.
Figure 2:
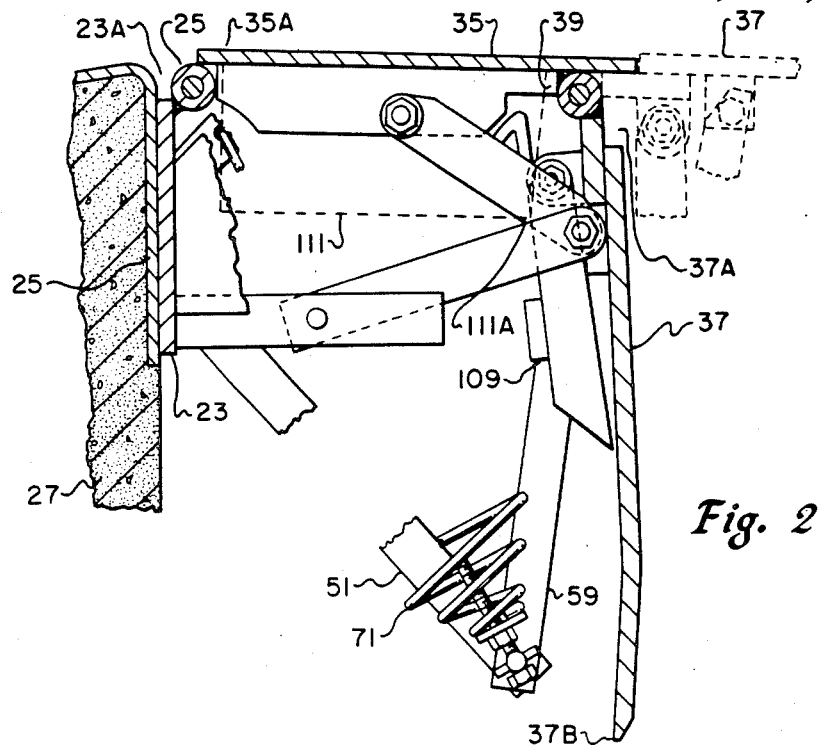
FIG. 2 is a cross-sectional view of the dock leveler of FIG. 1 taken through the lines 2—2 thereof.
Figure 4:
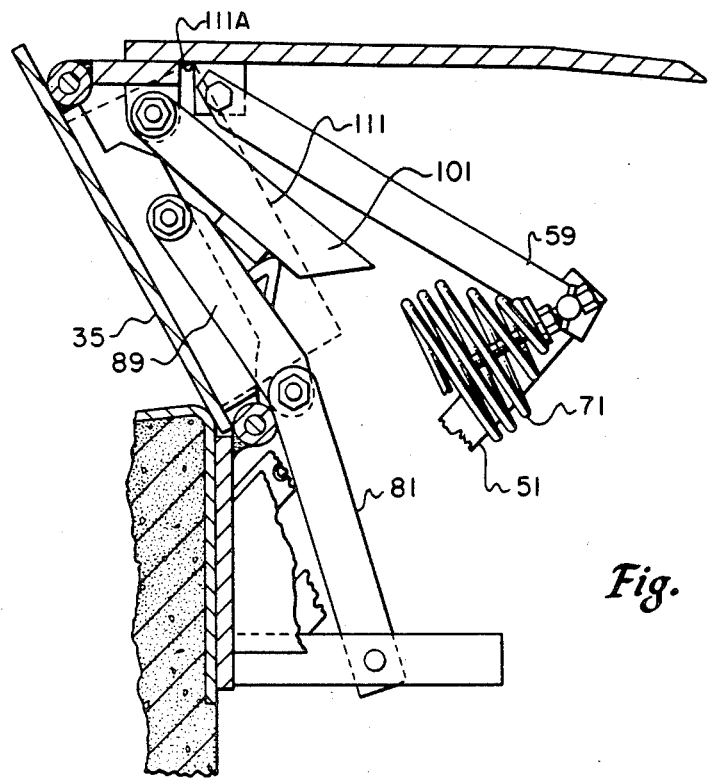
FIG. 4 is a cross-sectional view of the dock leveler of FIG. 1 taken through the lines 2—2 thereof, but with its bridge plate in a rearward position.
Figure 5:
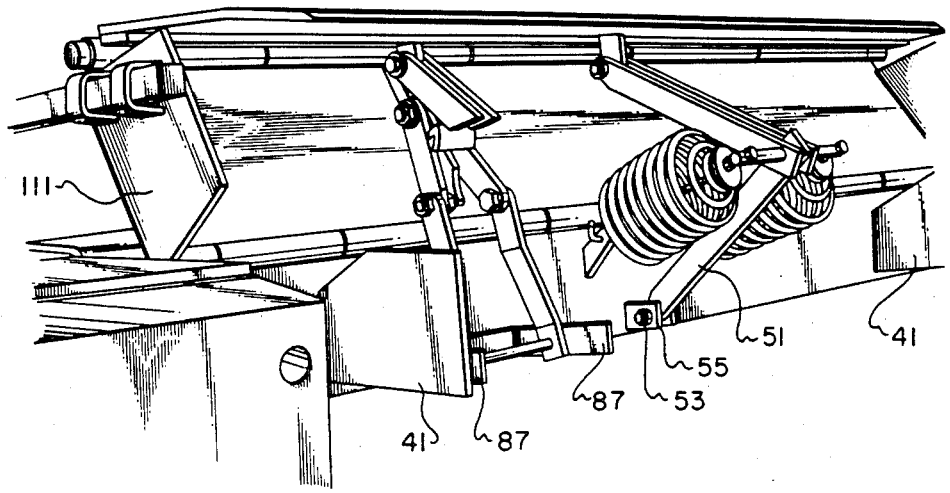
FIG. 5 is another view of the dock leveler with its bridge plate in a rearward position.

Referring to the drawings, reference numeral 21 identifies a dock leveler which incorporates the invention. The dock leveler 21 includes a base plate 23 attached to the upper side edge 25 of a dock 27 between two bumper blocks 29 also attached to the upper edge of the dock. Each of the bumper blocks 29 comprises a metal base 31 to which is attached a rubber or elastomer member 32. A bridge plate 35 has an inner edge 35A pivotally coupled to the upper edge 23A of the plate 23 by means of a hinge 25. A lip plate 37 has an inner edge 37A pivotally coupled to the outer edge 35B of the bridge plate 35 by means of a hinge 39. Two stop plates 41 are connected to the base plate 23 and extend outward therefrom. The bridge plate 35 can be pivoted to a forward extended position as shown in FIGS. 1 and 2 and to a rearward position as shown in FIGS. 4 and 5. At its forward extended position, the bridge plate 35 is supported in a generally horizontal or level position by the stop plates 41. The upper edge of the dock 27 acts to prevent the bridge plate 35 from pivoting rearward beyond that shown in FIG. 4.

The lip plate 37 can be pivoted to an extended position as shown partially in dotted form in FIG. 2 and to a folded position as shown in FIG. 4 wherein it forms an acute angle with the bridge plate 35. In the extended position, the lip plate 37 forms an extension of the bridge plate 35.

A lower linkage 51 has a lower end pivotally connected to the lower edge of the base plate 23 by a bolt 53 supported between two studs 55 which are connected to the plate 23. The upper end of the linkage 51 is pivotally connected by a pin 57 to the lower end of a second linkage 59. The upper end of the linkage 59 is pivotally connected to the inner end of the lip plate 37 at its underside by a bolt 61. The bolt 61 is supported by a stud 63 which is connected to the lip plate 37.

Two springs 71 have their inner ends connected to the base plate 23 and their outer ends connected to the pin 57 of the linkages 51 and 59.

The dock leveler as just described including the three plate 23, 35, and 37, the stops 41, the linkages 51 and 59, and the springs 71 forms part of the prior art. When the dock leveler is not being used, it is in the position shown in FIG. 1 wherein the bridge plate 35 rests on the stop 41 in its extended position and the lip plate 37 hangs downward as shown in FIGS. 1 and 2. In order to use the dock leveler and to position its lip plate 37 on the bed of a truck, the plates 35 and 37 in the past have been lifted out of the way by placing a hook in a slot (not shown) formed in the free edge of the lip plate 37 and lifting both plates 35 and 37 rearward and out of the way as the truck backs against the dock until it butts against the elastomer members 33. The plates 35 and 37 then are brought to their extended positions with the free edge of the plate 37 resting on the rear end of the bed of the truck. The springs 71 facilitate in the lifting process; however, they do not provide sufficient assistance to the operator.

There now will be described the apparatus of the invention which may be readily installed on the dock leveler to provide a simple and effective device for allowing the operator to move the plates 35 and 37 from their normal nonuse positions of FIG. 1 to their extended positions wherein the free edge 37B of the lip 37 rests on the rear edge of the bed of a truck. The apparatus comprises lower linkages 81 and 83 having their' lower ends pivotally mounted on a pin 85 which is secured to the plate 23 by two brackets 87. The upper ends of the linkages 81 and 83 are pivotally coupled to the lower ends of two upper linkages 89 and 91 by two bolts 93 and 95. The upper ends of the linkages 89 and 91 are pivotally coupled by a bolt 93 to a bracket 95 which is secured to the underside of the bridge plate 35. A V-shaped member 97 is connected between the linkages 89 and 91 such that its apex extends upward above the two linkages 89 and 91 as shown in the drawings.

A catch member 101 has its upper end pivotally coupled by way of a bolt 103 to a bracket 105 which is connected to the underside of the lip plate 37 near its inner end such that the catch 101 can hang downward from the plate 37. A boss 107 is connected to the edge of the catch member 101 facing the plate 35 inward of the free end of the catch 101 forming a V-shaped surface 109 for engaging the member 97.

A holding plate 111 is attached to the underside of one edge of the bridge plate 35. Two loops 113 are secured to the outside of the plate 111 for removably receiving the end of a bar or handle 115. In FIGS. 2-4 and 6, the plate 111 is shown in dotted form.

Figure 6:
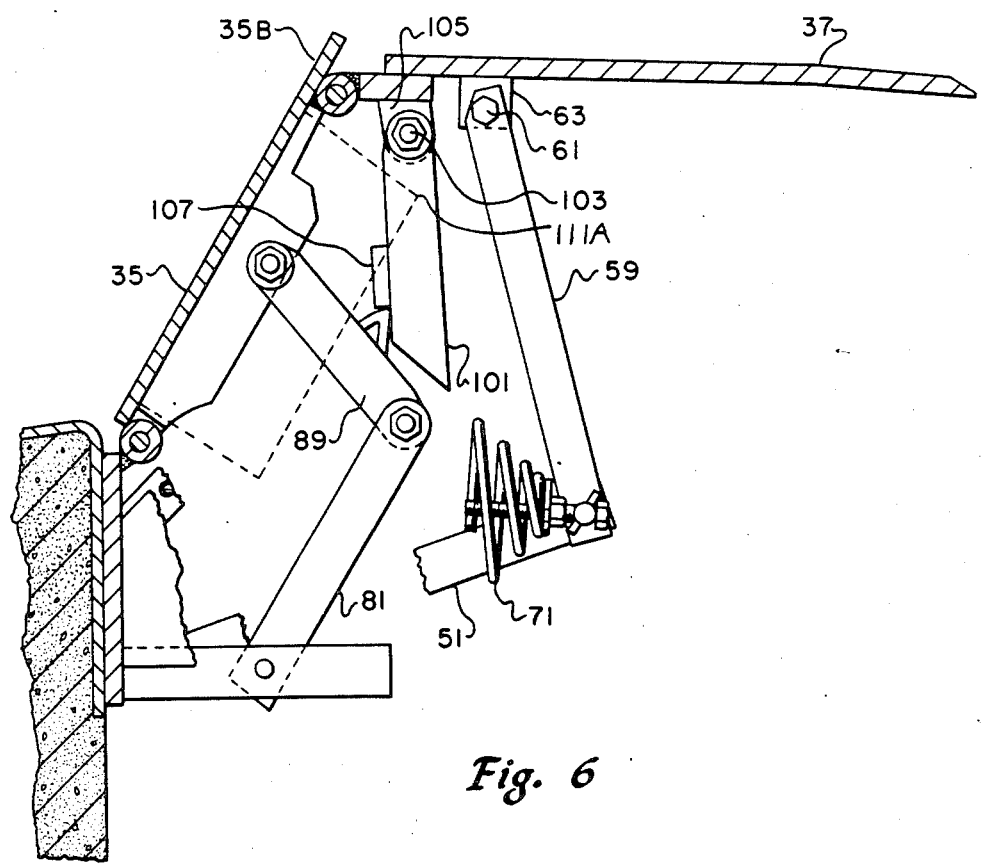
FIG. 6 is a cross-sectional view of the dock leveler of FIG. 1 taken through the lines 2—2 thereof, but with its bridge plate moved forward from its rearward position and with its lip plate extended outward therefrom.
Figure 3:
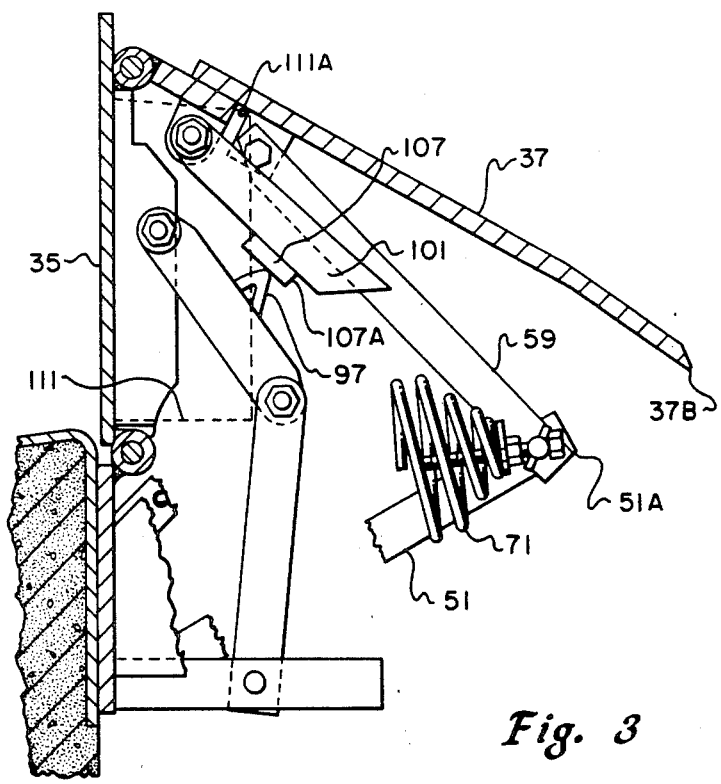
FIG. 3 is a cross-sectional view of the dock leveler of FIG. 1 taken through the lines 2—2 thereof, but with its bridge plate in a vertical position.

In order to operate the dock leveler to place the lip plate 37 on the rear edge of a truck or the like, the operator inserts the handle 115 into the loops 113 and rotates the handle 115 rearward and downward. This causes the bridge plate 35 to be rotated rearward. Initially, the free edge 37B of the lip plate will engage and rest against the outer edge 51A of the linkage 51 as the bridge plate 35 is rotated rearward. As the bridge plate 35 is rotated further rearward, the edge 111A of the holding plate 111 will engage the underside of the lip plate 37 as shown in dotted form in FIG. 3 holding the lip plate 37 away from the bridge plate 35. This allows the catch member 101 to swing downward. In FIG. 3, the catch member 101 is in a position such that the underside of its boss 107 rests against the apex of the V-shaped member or stud 97. As the bridge plate 35 is rotated further rearward, the edge 111A of the holding plate 111 still engages and maintains the lip plate 37 away from the bridge plate 35. At about the maximum rearward position of the bridge plate 35 the boss 107 will be moved rearward of the stud 97 such that the catch member 101 will drop downward to allow the apex of the stud 97 to engage the V-shaped surface 109 formed between the boss 107 and the catch member 101 as shown in FIG. 4. In this position, the edge 107A of the boss 107 will bear against the stud 97 to maintain the lip plate 37 away from the bridge plate 35 and allow the operator to rotate the bridge plate 35 forward as shown in FIG. 6. In this position, the lip plate 37 will also extend forward of the bridge plate 35. As the bridge plate 35 is rotated forward, the edge 107A of the boss 107 in effect slides against the inner side of the apex of the stud 97 allowing the catch member 101 to maintain the lip plate 37 away from and forward of the bridge plate 35 until a position is reached where the boss 107 will slip off of the stud 97 allowing the forward edge 37B of the lip plate 37 to fall against the rear edge of the bed of the truck. A partially extended position of the lip plate 37 is shown in dotted form in FIG. 2.

In order to place the dock leveler in its normal nonuse position, the truck can merely be moved forward allowing the lip plate 37 to fall and hang downward as shown in FIG. 2. In the alternative, the operator can rotate the bridge plate 35 to move it and the lip plate 37 rearward and away from the bed of the truck allowing the truck to move forward. The operator then can move the bridge plate 35 and hence the lip plate 37 forward to place the dock leveler in the nonuse position of FIG. 2. In this position, the operator can then remove the handle 115 from the loops 113. In the alternative, the handle 115 employed may have a top plate attached to its upper end whereby the handle 115 may be allowed to slide downward through the loops 113 when the dock leveler is in its normal nonuse position with the top plate holding the handle 115 against the top loop 113. As shown in FIG. 4, the linkages 81, 83, and 89, 91 also act to limit the maximum rearward movement of the bridge plate 35.

As can be understood, the apparatus of the invention can be readily retrofitted to an existing dock leveler without removing any of the center springs 71 or the center linkages 51 and 59 or without removing any other components from the leveler. In this respect, the brackets 87 and 95 of the linkages 81, 83 and 89, 91 can be secured to the base plate 23 and to the bridge plate 35 to one side of the linkages 51 and 59 and the springs 71. In addition, the bracket 105 of the catch member 101 can be secured to the underside of the lip plate 37 in a proper position on the same side of the linkages 51 and 59 and the springs 71. The holding plate 111 is readily securable to the edge of the bridge plate 35.

Figure 8:
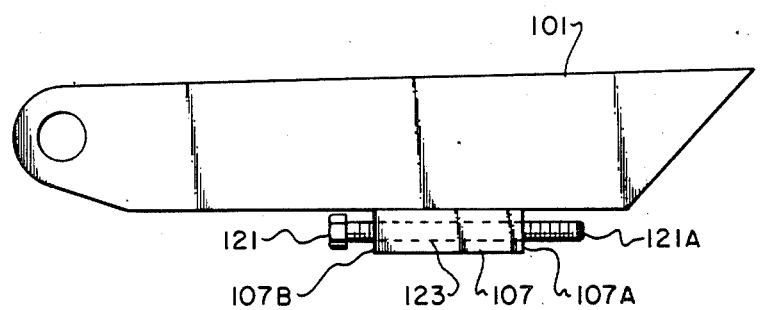
FIG. 8 illustrates a modified catch used in the invention.

Referring to FIG. 8, the boss 107 is secured to the underside of the catch 101 at a position rearward of that shown in FIGS. 2-7, and has a bolt 121 screwed through a threaded aperture 123 formed through the boss between its edges 107A and 107B. In this embodiment, the end 121A of the bolt 121 will engage the apex of the stud 97 to properly hold the lip plate 37 as described above in use of the leveler. The position of the end 121A of the bolt 121 relative to the catch 101 can be adjusted if required, by screwing the bolt inward or outward of the aperture 123.

I claim:

1. Apparatus for use with a dock leveler of the type having a base means adapted to be attached to a dock, a bridge plate having a first edge pivotally coupled to an edge of said base means for pivotal movement in rearward and forward directions between a forward extended position and a rearward position, stop means coupled to said base means to be engaged by said bridge plate when said bridge plate is in its forward extended position for preventing said bridge plate from pivoting in a forward direction beyond said forward extended position, a lip plate pivotally coupled to an edge portion of said bridge plate opposite said first edge for pivotal movement between an extended position generally forming an extension of said bridge plate and a folded position wherein said lip plate forms an acute angle with said bridge plate, said apparatus comprising:

first and second linkage means having first ends respectively pivotally coupled together, the other end of said first linkage means being adapted to be pivotally coupled to the underside of said bridge plate, the other end of said second linkage means being adapted to be pivotally coupled to said base means for pivotal movement about a pivot axis that is to be fixed relative to said base means, catch means having a first end adapted to be pivotally coupled to the under side of said lip plate and a free end adapted to hang downward from said lip plate, said catch means having an engaging means adapted to engage structure of said first linkage means when said bridge plate is moved to its rearward position for holding the free end of said lip plate away from and forward of said bridge plate as said bridge plate is moved from its rearward position toward its forward extended position for allowing said lip plate to engage the bed or the like of a vehicle, said engaging means of said catch means being adapted to be disengaged from said structure of said first linkage means when said bridge plate reaches a given position as it moves toward its forward extended position.

2. The apparatus of claim 1, wherein:
said engaging means of said catch means is adjustable relative to the length of said catch means.

3. A dock leveler apparatus, comprising:
a base means adapted to be attached to a dock,
a bridge plate having a first edge pivotally coupled to an edge of said base means for pivotal movement in rearward and forward directions between a forward extended position and a rearward position,
stop means coupled to said base means,
said stop means being located to be engaged by said bridge plate when said bridge plate is in its forward extended position for preventing said bridge plate from pivoting in a forward direction beyond said forward extended position,
said bridge plate being generally level when it engages said stop means,
means for allowing said bridge plate to be moved between its forward and rearward positions,
a lip plate pivotally coupled to an edge portion of said bridge plate opposite said first edge for pivotal movement between an extended position generally forming an extension of said bridge plate and a folded position wherein said lip plate forms an acute angle with said bridge plate, when said bridge plate is in its forward extended positon, said lip plate being adapted to be located in its extended position or to hang down from said bridge plate, first and second linkage means having first ends respectively pivotally coupled together, the other end of said first linkage means being pivotally coupled to the under side of said bridge plate, the other end of said second linkage means being pivotally coupled to said base means for pivotal movement about a pivot axis that is fixed relative to said base means, catch means having a first end pivotally coupled to the underside of said lip plate and a free end adapted to hang downward from said lip plate, said catch means having an engaging means adapted to engage structure of said first linkage means when said bridge plate is moved to its rearward position for holding the free end of said lip plate away from and forward of said bridge plate as said bridge plate is moved from its rearward position toward its forward extended position for allowing said lip plate to engage the bed or the like of a vehicle, said engaging means of said catch means being adapted to be disengaged from said structure of said first linkage means when said bridge plate reaches a given position as it moves toward its forward extended position.

4. The dock leveler apparatus of claim 3, wherein:
said structure of said first linkage means comprises lug means connected to the side of said first linkage means facing said lip plate.

5. The dock leveler apparatus of claim 3, wherein:
said engaging means of said catch means is adjustable relative to the length of said catch means.

6. The dock leveler apparatus of claim 3, comprising:
holding means attached to the bottom side of said bridge plate which allows said lip plate to hang downward from said bridge plate when said bridge plate is in its forward extended position and which engages and holds the free end of said lip plate away from said bridge plate as said bridge plate is moved to its rearward position to allow said catch means, to swing to a position for allowing its engaging means to engage said structure of said first linkage means for holding the free end of said lip plate away from and forward of said bridge plate as said bridge plate is moved from its rearward position toward its forward extended position.

7. The dock leveler apparatus of claim 6, wherein:
said structure of said first linkage means comprises lug means connected to the side of said first linkage means facing said lip plate,
said engaging means of said catch means is adjustable relative to the length of said catch means.

* * * * *